July 21, 1964 G. C. McCORD ETAL 3,141,680
PORTABLE LUGGAGE HAVING RETRACTABLE WHEELS
Filed May 2, 1962 2 Sheets-Sheet 2
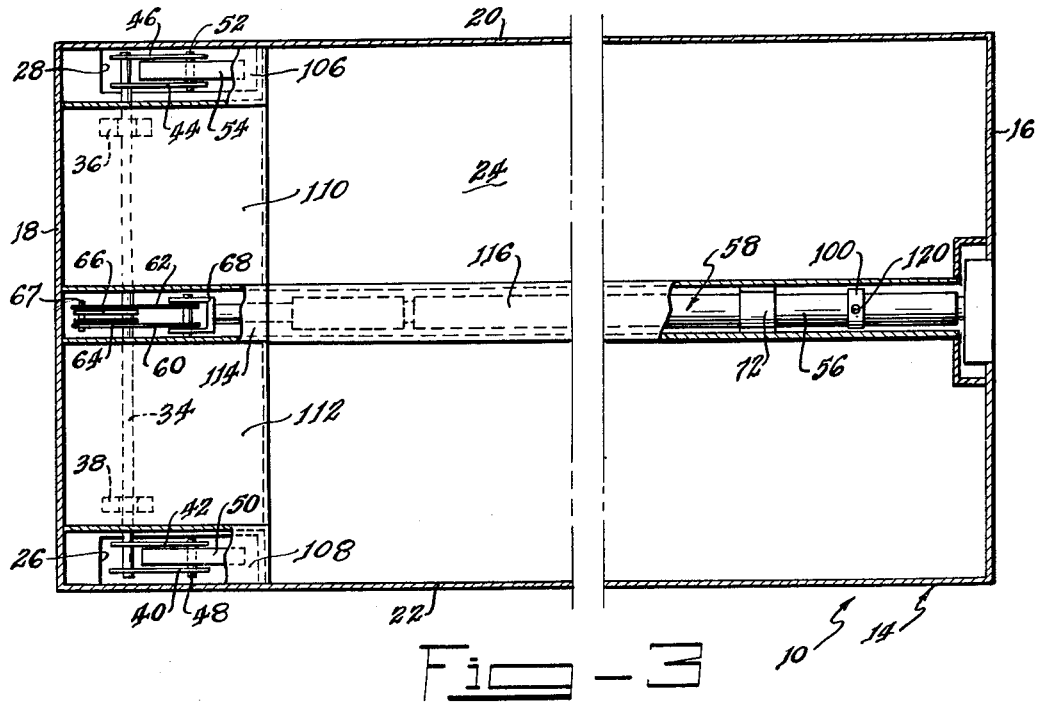
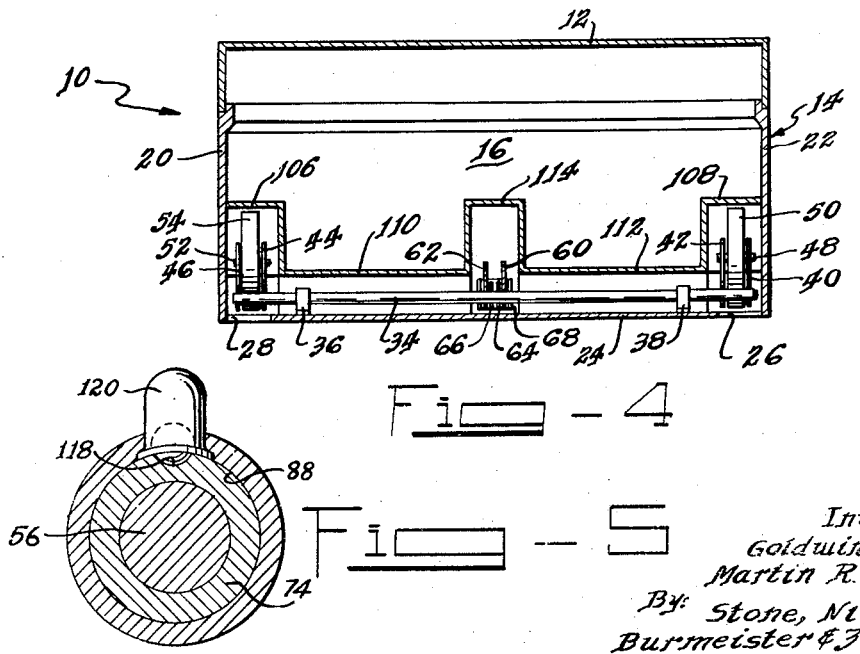
Inventors
Goldwin C. McCord
Martin R. Priban
By: Stone, Nierman,
Burmeister & Jummer
Attorneys

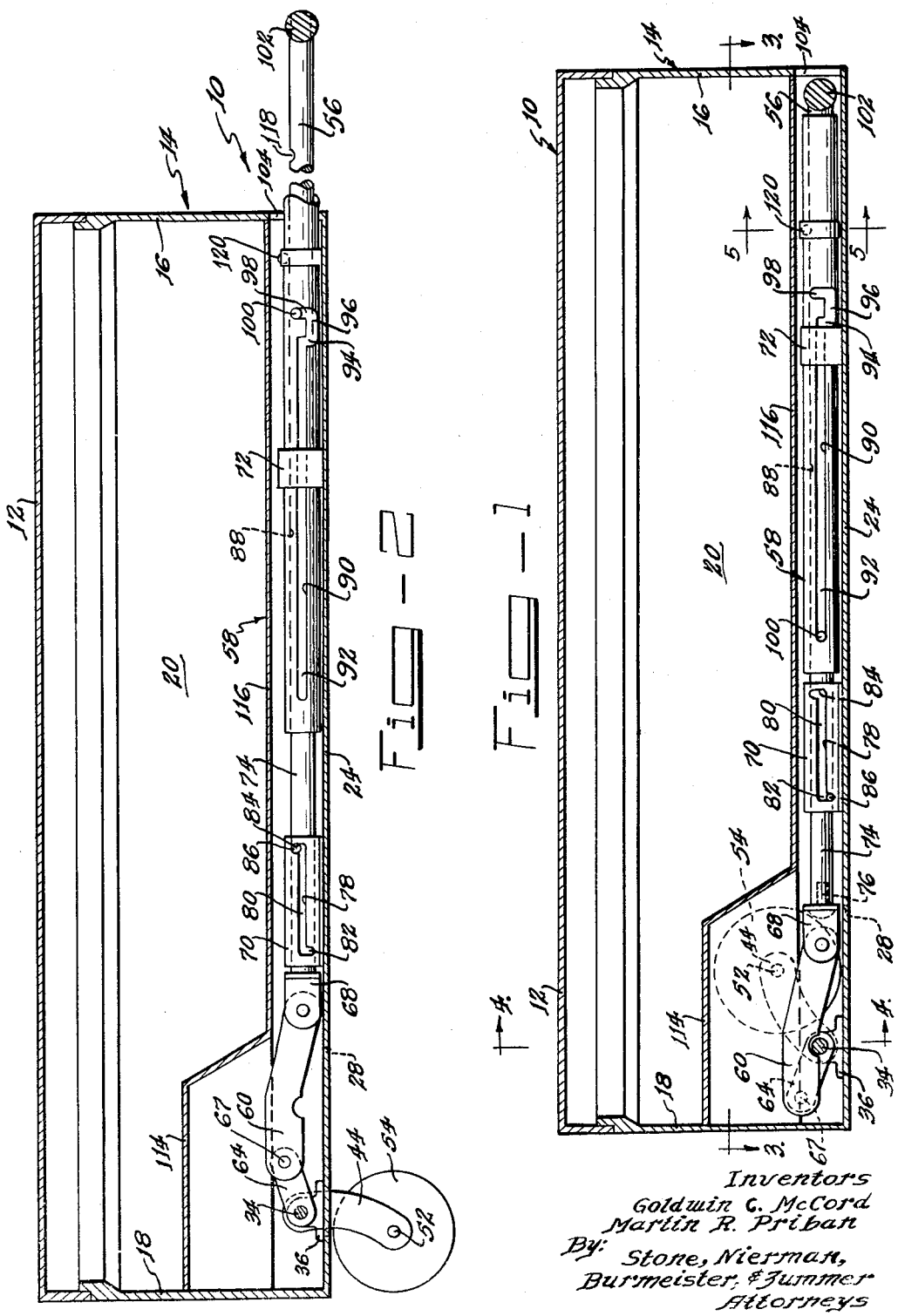

United States Patent Office 3,141,680
Patented July 21, 1964

3,141,680
PORTABLE LUGGAGE HAVING RETRACTABLE WHEELS
Goldwin C. McCord, 5127 S. Kedzie Ave., Chicago, Ill., and Martin R. Priban, 228 56th St., Downers Grove, Ill.
Filed May 2, 1962, Ser. No. 191,954
9 Claims. (Cl. 280—38)

The present invention relates generally to luggage, and more particularly to luggage equipped with retractable wheels or rollers to facilitate transporting the luggage.

It has been recognized for many years that it would be desirable to provide a trunk or other items of luggage with wheels, so that the trunk may be readily moved, even when loaded to a heavy weight. Further, Patent No. 854,602, entitled "Trunk," which issued to Peterson, discloses such a piece of luggage with a wheel mechanism which may be retracted for storage purposes. Further, Patent No. 2,539,993, which issued to Davis, entitled "Retractable Wheel Support for Luggage," discloses a trunk with a handle telescoping into the casing and employed for controlling the position of a pair of wheels between a position retracted within the trunk and a second position exterior to the trunk for trundling the trunk. Patent No. 2,510,745, of Norlin, entitled "Portable Luggage Having Retractable Wheels," discloses another mechanism for positioning a pair of wheels in a retracted position within a trunk or an extended position exterior to the trunk.

It is an object of the present invention to provide a combination piece of luggage and luggage carrier with a pair of retractable wheels which is simple to operate, more reliable than prior devices, and may be fabricated less costly than the prior devices.

It is a more specific object of the present invention to provide a piece of luggage with a telescoping handle and an improved mechanism operating on the handle for the luggage for extending and retracting a pair of wheels which are disposed within a compartment within the luggage in the retracted position.

These and further objects of the present invention will become readily apparent to those skilled in the art from a further consideration of this specification, particularly when viewed in the light of the drawings, in which:

FIGURE 1 is a vertical sectional view of a piece of luggage constructed according to the teachings of the present invention and provided with a pair of wheels which are illustrated in retracted position;

FIGURE 2 is a sectional view of the same piece of luggage illustrated in FIGURE 1, with the wheels thereof in extended position;

FIGURE 3 is a sectional view of the piece of luggage taken along the line 3—3 of FIGURE 1;

FIGURE 4 is a sectional view taken along the line 4—4 of FIGURE 1; and

FIGURE 5 is a sectional view taken along the line 5—5 of FIGURE 1.

As illustrated in the figures, the luggage is in the form of a trunk 10 having a cover 12 which fits and seals about a box 14. The box 14 has a pair of end walls 16 and 18, a pair of side walls, 20 and 22, and a bottom 24.

The bottom 24 is provided with a pair of elongated openings 26 and 28, which are disposed adjacent to the walls 22 and 20, respectively. The openings 26 and 28 have axes of elongation which are parallel to the walls 22 and 20, respectively, and these openings 26 and 28 are adapted to accommodate a pair of wheels to be described hereafter.

An axle 34 is mounted on the bottom 24 parallel to the end wall 18 by means of a pair of brackets 36 and 38. The axle 34 extends over the openings 26 and 28 near the edge of the openings adjacent to the end wall 18, and a pair of lever arms 40 and 42 are mounted in parallel spaced relationship on one end of the axle 34 confronting the opening 26. A second pair of lever arms 44 and 46 are mounted in parallel spaced relationship on the other end of the axle 34 confronting the opening 28. A pin 48 is mounted between the lever arms 40 and 42 remote from the axle 34, and one wheel 50 of the pair of wheels is journaled about the pin 48. In like manner, a pin 52 is mounted between the lever arms 44 and 46 parallel to the axle 34, and the second wheel 54 of the pair of wheels is journaled on the pin 52. Since the lever arms are secured to the axle 34, rotation of the axle 34 in the clockwise direction, as illustrated, causes the wheels 50 and 54 to pass through the openings 26 and 28 respectively, thereby extending the wheels from the trunk 10.

The wheels 50 and 54 are retracted and extended by means of a handle 56 operating through a lock mechanism 58, a first pair of lever arms 60 and 62 and a second pair of lever arms 64 and 66. The lever arms 64 and 66 are secured at one end on the axle 34 and are disposed in parallel spaced relationship. These lever arms 64 and 66 are disposed at a fixed angle to the lever arms 40 and 42 and 44 and 46, and this angle is greater than 90° and less than 180°. The ends of the lever arms 64 and 66 are pivotally mounted on the lever arms 60 and 62, respectively, by pins 67, and these lever arms 60 and 62 are pivotally attached to confronting legs of a U-shaped yoke 68. The yoke 68 is in turn secured on the lock mechanism 58.

The lock mechanism 58 employs two spaced guide blocks 70 and 72 which are secured on the bottom 24 of the trunk 10. The guide blocks 70 and 72 are disposed on an axis normal to the axle 34, centrally of the bottom 24, and a first shaft 74 is journaled in the guide blocks 70 and 72. One end of the first shaft 74 is secured to the yoke 68 by means of a bolt 76 which rotatably secures the portion of the U-shaped yoke 68 extending between the two legs thereof to the first shaft 74.

The first guide block 70 is provided with a slot 78 which extends therethrough, and which has a central portion 80 which is linear and disposed parallel to the axis of the first shaft 74. The slot 78 also is provided with offset portions 82 and 84 which extend in opposite directions from the linear portion 80 at the ends of the linear portion 80. The first shaft 74 is provided with a locking pin 86 which is translatably disposed within the slot 78 and is free to translation from one offset portion 82 to the other offset portion 84 and to be disposed in the offset portions.

The first shaft 74 is provided with an enlarged end portion with a channel 88 which extends from the end thereof opposite the axle 34. The first shaft is also provided with a slot 90 which extends therethrough into the channel 88. The slot 90 has a linear portion 92 which extends from the end thereof adjacent to the first guide block 70. The slot 90 terminates at its end opposite the linear portion 92 in a U-shaped portion formed by three normally disposed legs 94, 96, and 98. The leg 94 is disposed normal to the linear portion 92, while the leg 96 extends parallel to the linear portion 92. The leg 98 is parallel to the leg 94 and directed in the same direction from the portion 96 that the offset portion 84 is directed relative to the linear portion 80 of the slot 78 of the guide block 70.

The handle 56 is translatably disposed within the channel 88 of the first shaft 74 and the handle 56 forms a second shaft. A guide pin 100 protrudes normally from the handle 56 and is translatably disposed within the slot 90. The end of the handle opposite the guide pin 100 has a cross member 102 which facilitates guidance of the handle.

In order to extend the wheels 50 and 54 from the trunk 10, the cross member 102 of the handle 56 is fished from a slot 104 of the trunk 10 and withdrawn from the first shaft 74, thereby causing the guide pin 100 to be translated in a linear path along the linear portion 92 of the slot 88. When the guide pin 100 reaches the portion 94 of the slot 90, which is disposed at a right angle to the linear portion 92 thereof, the guide pin will stop translation of the handle 56. Thereafter, the handle must be rotated in a counter-clockwise position to move the guide pin 100 through the portion 94 of the slot 90 into abutment with the surface of the portion 96 of the slot 90. The handle 56 may then be withdrawn further from the first shaft 74 until the guide pin 100 abuts the portion 98 of the slot 90, and thereafter, the handle 56 must be rotated in the clockwise position to move the guide pin 100 to the extreme right hand limit of its travel in the portion 98 of the slot 90 and to rotate the guide pin 86 into the linear portion 80 of the slot 78 of the first guide block 70. Thereafter, the handle 56 may be further withdrawn and thereby translate the guide pin 86 in the slot 78 into abutment with the offset portion 84 of the slot 78. Further, withdrawal of the handle 56 exerts force through the two pairs of lever arms 60 and 62 and 64 and 66 to rotate the shaft 34 in the clockwise direction and to rotate the wheels 54 to the extended position. The handle 56 is then further rotated in the clockwise direction to cause the pin 86 to travel into the offset portion 84 of the slot 78 in order to lock the wheels 50 and 54 in the extended position. It is to be noted that in this position, the handle 56 may not be telescoped into the channel 88 of the first shaft 74, since the guide pin 100 is disposed in the portion 98 of the slot 90 which is at right angles or normal to the axis of the channel 88.

In order to retract the wheels, the handle 56 is rotated in the counterclockwise direction to move both the guide pin 100 from the end of the portion 98 of the slot 90 and the guide pin 86 from the offset portion 84 of the slot 78 of the first guide block 70. Thereafter, the handle 56 may be telescoped inwardly to move the guide pin 100 into abutment with the surface of the portion 94 of the slot 90, thereby forcing the guide pin 86 along the linear portion 80 of the slot 78 in the first guide block 70 to the end of this linear portion 80, and thereafter to transmit force through the two pairs of lever arms 60 and 62 and 64 and 66 to the axle 34. The force thus transmitted to the axle 34 is effective to rotate the axle in a counterclockwise direction as viewed in FIGURES 1 and 2 to retract the wheels 50 and 54 into the trunk 10. Further rotation of the handle 56 in the counterclockwise direction will cause the pin 86 to move into the offset portion 82 of the slot 78 to lock it in position. The handle 56 is thereafter rotated in the clockwise direction to align the pin 100 with the linear portion 92 of the slot 90, and then telescoped into the channel 88.

In order to prevent the contents of the trunk 10 from interfering with the operation of the retractable wheel mechanism, or the retractable wheel mechanism from injuring the contents of the trunk, a suitable cover is provided for the retractable wheel mechanism. This cover takes the form of a pair of box-shaped enclosures 106 and 108 located in the corners between the end wall 18 and the side walls 20 and 22 for the purpose of covering the wheels 50 and 54 and the lever arms 40 and 42, and 44 and 46 associated with the wheels. Shallow enclosures 110 and 112 extend from the enclosures 106 and 108, respectively, to a central enclosure 114 which extends above the shallow enclosures 110 and 112 and accommodates the two pairs of lever arms 60 and 62, and 64 and 66. A shallow elongated enclosure 116 extends from this central enclosure 114 to the slot 104 in the wall 16 of the trunk 10, and this elongated enclosure 116 protects and surrounds the locking mechanism 58.

The handle 56 is provided with a recess 118 adjacent to the cross member 102, and this recess 118 mates with a ball detent mechanism 120 mounted on the first shaft 74 adjacent to the open end thereof when the handle 56 is fully inserted into the trunk 10. The purpose of the detent mechanism 120 and recess 118 is to prevent the handle 56 from coming out of the slot 104 in the wall 16 of the trunk when the retractable wheels 50 and 54 are in their retracted position.

It is apparent from the foregoing disclosure that the inventors have provided a combination piece of luggage and retractable wheel mechanism which is rugged, durable and relatively inexpensive to manufacture. Those skilled in the art will devise many improvements and many modifications and utilities for the invention herein set forth. It is therefore intended that the scope of the present invention be not limited by the foregoing disclosure but rather only by the appended claims.

The invention claimed is:

1. A piece of luggage comprising a box having a bottom, a first end wall extending from one end of the bottom, a second end wall extending from the other end of the bottom, said bottom having an opening therein adjacent to the first end wall, a first shaft rotatably mounted on the interior side of the bottom adjacent to and parallel with the first end wall, a first lever arm secured to and rotatable with the first shaft, a wheel rotatably mounted on the first lever arm, a second lever arm secured to and rotatable with the first shaft, said second lever arm being disposed at an angle between 90 degrees and 180 degrees with the first lever arm, and means for positioning the second lever arm between a first position wherein the wheel is disposed on one side of the bottom and a second position wherein the wheel is disposed on the other side of the bottom including a first guide block mounted on the inside surface of the bottom, a second guide block mounted on the inside surface of the bottom, said first and second guide blocks being spaced from each other and having channels extending therethrough disposed on a common axis normal to the shaft, a second shaft slidably disposed within the channels of the first and second guide blocks, a third lever arm pivotably mounted on the end of the second shaft confronting the first shaft and pivotally secured on the end of the second lever arm opposite the first shaft, said second shaft having a channel extending axially therein from the end opposite the third lever arm, a third shaft slidably disposed within the channel of the second shaft, and releasable means for attaching the third shaft on the second shaft for translation in either direction along the axis thereof.

2. A piece of luggage comprising the elements of claim 1 wherein the second shaft is provided with an elongated slot communicating with the channel therein, said slot terminating at both ends, the releasable means for attaching the third shaft on the second shaft for the translation in either direction comprises a pin mounted on the third shaft and slidably disposed within the slot of the second shaft.

3. A piece of luggage comprising a box having a bottom, a first end wall extending from one end of the bottom, a second end wall extending from the other end of the bottom, said bottom having an opening therein adjacent to the first end wall, a first shaft rotatably mounted on the interior side of the bottom adjacent to and parallel with the first end wall, a first lever arm secured to and rotatable with the first shaft, a wheel rotatably mounted on the first lever arm, a second lever arm secured to and rotatable with the first shaft, said second lever arm being disposed at an angle between 90 degrees and 180 degrees with the first lever arm, and means for positioning the second lever arm between a first position wherein the wheel is disposed on one side of the bottom and a second position wherein the wheel is disposed on the other side of the bottom including a first guide block mounted on the inside surface of the bottom, a second guide block mounted on the inside surface of the bottom, said first and second guide blocks being spaced from each other and having channels extending therethrough disposed on a common axis normal to the first shaft, a second shaft slidably disposed within the channels of the first and second guide blocks, a third lever arm pivotably mounted on the end of the second shaft confronting the first shaft and pivotally secured on the end of the second lever arm opposite the first shaft, said second shaft havng a channel extending axially therein from the end opposite the third lever arm, a third shaft slidably disposed within the channel of the second shaft, the second shaft being provided with an elongated slot communicating with the channel therein, said elongated slot having a linear portion extending from the end confronting the first shaft and a U-shaped portion at the opposite end thereof, the third shaft having a pin mounted thereon and slidably disposed within the slot of the second shaft, the first guide block being disposed between the third lever arm and the slotted portion of the second shaft and having an elongated slot disposed therein, the elongated slot in the first guide block having a linear portion disposed parallel to the axis of the second shaft and offset portions of the ends thereof, and said second shaft having a pin mounted thereon and slidably disposed within the elongated slot of the first guide block.

4. A piece of luggage comprising the elements of claim 3 wherein the third shaft is provided with a cross member extending normally therefrom on the end thereof opposite the first shaft and the second end wall at the box is provided with a slot confronting the cross member to permit the cross member to be translated out of the box.

5. A piece of luggage comprising the elements of claim 4 in combination with a housing mounted on the box and together with the box enclosing the first shaft, the first lever arm, the second lever arm, the wheel, and the means for positioning the second lever arm, whereby the interior of the box may be utilized for objects to be carried from one place to another.

6. A piece of luggage comprising the elements of claim 3 wherein the second shaft is provided with an opening therein which is adapted to confront a recess in the third shaft in one position of the third shaft relative to the second shaft, in combination with a ball detent mechanism mounted in the opening of the second shaft and adapted to engage the recess in the third shaft to restrain the third shaft from translation relative to the second shaft.

7. A piece of luggage comprising a box having a bottom, a first end wall extending from one end of the bottom, a second end wall extending from the other end of the bottom, side walls extending between the end walls and the bottom, and a cover, said bottom having a pair of openings therein adjacent to the first end wall and each opening being located adjacent to one of the side walls, a first shaft rotatably mounted on the interior side of the bottom adjacent to and parallel with the first end wall, a first pair of parallel lever arms secured to and rotatable with the first shaft confronting the first of said openings, a pin extending between the first pair of lever arms, a wheel rotatably mounted on the pin, a second pair of lever arms secured and rotatable with the first shaft confronting the second opening in the bottom, said second pair of lever arms being disposed in the same axial plane of the first shaft as the first pair of lever arms, a second pin disposed between the second pair of lever arms adjacent to the end thereof opposite the first shaft, a second wheel rotatably mounted on the second pin, a third pair of lever arms secured to and rotatable with the first shaft, said third pair of lever arms being disposed at an angle between 90 degrees and 180 degrees from the lever arms of the first and second pair, and means for positioning the third pair of lever arms between a first position wherein the wheels are disposed on one side of the bottom and a second position wherein the wheels are disposed on the other side of the bottom including a first guide block mounted on the inside surface of the bottom, a second guide block mounted on the inside surface of the bottom, said first and second guide blocks being spaced from each other and having channels extending therethrough disposed on a common axis normal to the first shaft and disposed centrally between the side walls of the box, a second shaft slidably disposed within the channels of the first and second guide blocks, a U-shaped yoke having a pair of legs and a central interconnecting portion mounted on the end of the second shaft confronting the first shaft, said yoke being mounted by the central portion interconnecting the legs thereof and the legs thereof extending from the second shaft parallel to the axis of the second shaft, a fourth pair of lever arms, each of said lever arms of the fourth pair being pivotally mounted at one end on one of the legs of the yoke and pivotally mounted on the other end on the end of one of the lever arms of the third pair, said second shaft having a channel extending axially therein from the end opposite the fourth pair of lever arms, a third shaft slidably disposed within the channel of the second shaft, the second shaft being provided with a first elongated slot communicating with the channel therein, said first elongated slot having a linear portion terminating at one end adjacent to the first shaft and a U-shaped portion at the other end of the linear portion, a third pin disposed on the third shaft and slidably disposed within the first slot, the first guide block being provided with a second elongated slot having a linear portion disposed parallel to the axis of the second shaft and offset portions extending normally from the linear portion of each end of the linear portion, a fourth pin mounted on the second shaft and slidably disposed within the second slot in the first guide block, a cross member mounted on the end of the third shaft remote from the first shaft, the box being provided with a slot confronting the cross member and permitting the cross member and third shaft to be translated exterior of the box.

8. A piece of luggage comprising the elements of claim 7 wherein the second shaft is provided with an aperture extending between the channel therein and the exterior surface thereof, and the third shaft is provided with a recess adapted to confront the aperture in the second shaft, in combination with a ball detent mechanism mounted in the aperture of the second shaft and adapted to engage the recess in the third shaft to retard translation of the third shaft relative to the second shaft.

9. A piece of luggage comprising the elements of claim 7 in combination with a housing having a tubular portion extending from the bottom about the second and third shafts and the first and second mounting blocks, a second portion extending from the tubular portion about the first wheel, the second wheel, the first pair of lever arms, the second pair of lever arms, the third pair of lever arms, and the fourth pair of lever arms.

References Cited in the file of this patent
UNITED STATES PATENTS

| | | |
|---|---|---|
| 44,936 | Clapp | Nov. 8, 1864 |
| 2,510,754 | Norlin | June 6, 1950 |
| 2,523,535 | Little | Sept. 26, 1950 |
| 2,581,417 | Jones | Jan. 8, 1952 |
| 2,893,351 | Wager | July 7, 1959 |